(12) United States Patent
Proffit

(10) Patent No.: US 6,360,890 B1
(45) Date of Patent: Mar. 26, 2002

(54) APPARATUS FOR HOLDING AND DISPLAYING A PLURALITY OF OBJECTS

(75) Inventor: J. Rockland Proffit, Davidson, NC (US)

(73) Assignee: Napco, Inc., Sparta, NC (US)

(*) Notice: Subject to any disclaimer, the term of this patent is extended or adjusted under 35 U.S.C. 154(b) by 0 days.

(21) Appl. No.: 09/649,979

(22) Filed: Aug. 29, 2000

Related U.S. Application Data

(60) Provisional application No. 60/211,702, filed on Jun. 15, 2000.

(51) Int. Cl.$^7$ ............................................... B65D 89/97
(52) U.S. Cl. ........................ 206/308.1; 206/472; 402/73
(58) Field of Search .............................. 206/308.1, 309, 206/311, 313, 387.13, 472; 402/73, 74, 75, 79, 62, 14, 21.1

(56) References Cited

U.S. PATENT DOCUMENTS

| | | | |
|---|---|---|---|
| 554,090 A | * | 2/1896 | Reifschneider .............. 402/73 |
| 581,674 A | * | 4/1897 | Burton .......................... 402/73 |
| 1,083,539 A | * | 1/1914 | Housh .......................... 206/75 |
| 1,287,842 A | * | 12/1918 | Betts ........................ 402/80 R |
| 3,822,099 A | * | 7/1974 | Angle ....................... 402/80 R |
| 4,180,341 A | * | 12/1979 | Langhorst ................. 402/80 R |
| 5,290,118 A | | 3/1994 | Ozeki |
| 5,291,990 A | | 3/1994 | Sejzer |
| 5,501,326 A | | 3/1996 | Shuhsiang |
| 5,501,540 A | | 3/1996 | Ho |
| 5,513,749 A | | 5/1996 | Simmons |
| 5,531,320 A | | 7/1996 | Uchida |
| 5,575,387 A | | 11/1996 | Gelardi |
| 5,588,527 A | | 12/1996 | Youngs |
| 5,588,528 A | | 12/1996 | Ozeki |
| 5,590,827 A | | 1/1997 | Nimpoeno |
| 5,636,869 A | * | 6/1997 | Holmes ......................... 281/45 |
| 5,669,491 A | | 9/1997 | Pettey |
| 5,682,992 A | | 11/1997 | Hunt et al. |
| 5,685,424 A | | 11/1997 | Rozek et al. |
| 5,690,219 A | | 11/1997 | Harrer |
| 5,690,220 A | | 11/1997 | Swan |
| 5,692,607 A | | 12/1997 | Brosmith et al. |
| 5,697,499 A | | 12/1997 | Reiter |
| 5,699,905 A | | 12/1997 | Hara |
| 5,713,462 A | | 2/1998 | Hansen |
| 5,713,605 A | | 2/1998 | Pace et al. |
| 5,725,093 A | | 3/1998 | Yamaguchi et al. |
| 5,762,246 A | | 6/1998 | Drew |
| 5,772,019 A | | 6/1998 | Reed |
| 5,775,490 A | | 7/1998 | Baker et al. |
| 5,782,349 A | | 7/1998 | Combs |
| 5,785,399 A | | 7/1998 | Frankeny et al. |
| 5,788,075 A | | 8/1998 | Wrabel |
| 5,791,468 A | | 8/1998 | House |
| 5,799,782 A | | 9/1998 | Gelardi |
| 5,803,250 A | | 9/1998 | Mori |
| 5,806,672 A | | 9/1998 | Bosworth |
| 5,813,525 A | | 9/1998 | McQueeny |
| 5,823,333 A | | 10/1998 | Mori |
| 5,833,063 A | | 11/1998 | Ho |
| 5,839,576 A | | 11/1998 | Kim |
| 5,848,668 A | | 12/1998 | Paloheimo |
| 5,857,565 A | | 1/1999 | Baker et al. |

\* cited by examiner

*Primary Examiner*—Shian Luong
(74) *Attorney, Agent, or Firm*—Kennedy Covington Lobdell & Hickman, LLP

(57) ABSTRACT

A storage book for holding a plurality of discs, other substantially-flat objects, or combinations of discs and objects, such as CDs, DVDs, computer diskettes, photographs, or the like, and having front and back covers interconnected by a spine member and movable between a closed position, in which the covers are generally stacked in parallel disposition to one another, and an open position, in which the covers are generally co-planar, and having a spacer attached to one of the covers, and further having at least two adjacent disc holders each pivotally mounted at a fixed location on the spacer such that the disc holders are movable between a folded position, in which the disc holders fully overlap in stacked relation when the covers are in closed or opened position, and an unfolded position, in which the disc holders partially overlap in staggered relation to one another when the covers are in open position.

25 Claims, 7 Drawing Sheets

APPARATUS FOR HOLDING AND DISPLAYING A PLURALITY OF OBJECTS

CROSS-REFERENCE TO RETAILED APPLICATIONS

This application claims the benefit of U.S. Provisional Patent Application Serial No. 60/211,702 to J. Rockland Proffit, filed Jun. 15, 2000.

FIELD OF THE PRESENT INVENTION

The present invention relates broadly to storage containers and, more particularly, to storage books for holding a plurality of substantially-planar objects, such as music or computer compact discs, DVDs, computer diskettes, video discs, and photographs.

BACKGROUND OF THE INVENTION

There are many types of containers used to store and display discs for retail sale. For example, audio compact discs (CDs) sold by the music industry and computer discs sold by the computer software industry are typically packaged in plastic containers, known in the trade as "jewel boxes." Jewel boxes typically have a plastic press-insert base and a transparent plastic cover. Such jewel boxes are often further encased in cardboard packaging for retail display and for additional protection of the discs.

After retail purchase, consumers have the option of keeping each disc in its own jewel box or transferring a plurality of discs to a different container capable of holding and displaying the plurality of discs. Not surprisingly, many different types of holders, racks, and containers for storing a plurality of jewel boxes or the discs themselves have been developed and sold in recent years.

For example, Pettey, U.S. Pat. No. 5,669,491, discloses a compact disc folder booklet that is capable of holding numerous CDs. The booklet has a front cover, a back cover, and multiple top-loaded folders all of which are joined at a center fold line that also acts as the spine between the front and back covers. The pages open and may be turned only in a conventional book-like manner.

Ozeki, U.S. Pat. No. 5,290,118, discloses a three-ring binder notebook that is capable of holding numerous pages, each page capable of holding one or more CDs. The pages of the notebook may be inserted, removed, and turned in a conventional three-ring notebook manner. Similarly, McQueeny, U.S. Pat. No. 5,813,525, discloses a compact disc holder that can be inserted into a three-ring binder or notebook and turned in a similar conventional manner.

Since many automobiles now have compact disc players, numerous types of disc holders have also been developed for use in cars. For example, Drew, U.S. Pat. No. 5,762,246, discloses a variable position compact disc storage device that is capable of mounting on a vehicle sun visor. Because of the limited amount of space between a typical sun visor and the roof of the car and in order to enable the device to hold a plurality of CDs in such a limited space, the CDs are stored in a fanned-out or staggered position. The device does not have the capability of folding down into a non-fanned-out position, nor can it be used in conjunction with a notebook or similar storage container.

Similarly, there are many different types of albums or notebooks that have been used for holding photographs, trading cards, and the like; however, none have the capability of storing and protecting the substantially planar objects (or mixed combinations of objects) in a notebook while also providing the capability of viewing each page alternatively in conventional page-by-page viewing or in a fanned-out manner for simultaneous viewing of multiple pages.

As is apparent from the foregoing, there currently exists a need for a storage book that is not only capable of holding a plurality of substantially planar objects using any of a number of different types of holders but also capable of displaying such objects (or combinations of different objects) in a stacked manner for conventional page-by-page viewing or in fanned-out substantially-flat manner for simultaneous viewing of a plurality of the pages, whichever is desired by the user. In addition, there currently exists a need for such storage book with an expandable storage capacity and with storage pages that can be easily added or removed.

BRIEF SUMMARY OF THE PRESENT INVENTION

Briefly described, the present invention includes a storage book for holding a plurality of substantially planar objects, comprising front and back covers interconnected by a spine member and movable between a closed position, wherein the covers are generally stacked in parallel disposition to one another, and an open position, wherein the covers are generally co-planar, comprising a spacer attached to one of the covers, and further comprising first and second adjacent object holders each pivotally mounted at a fixed location on the spacer such that the object holders are movable between a folded position, wherein the object holders fully overlap in stacked relation to one another when the covers are in the closed position or the open position, and an unfolded position, wherein the object holders partially overlap in staggered relation to one another when the covers are in the open position.

In another aspect of the invention, the first object holder is pivotally mounted to the spacer along a side edge of the first object holder, and the second object holder is pivotally mounted to the spacer intermediate opposed side edges of the second object holder. Each of the object holders may be pivotally mounted to the spacer along fold lines defined in the spacer. Further, the second object holder may be pivotally movable generally about the pivotal mounting of the first object holder to the spacer.

In another aspect of the present invention, one of the side edges of the second object holder may be substantially flush with an edge of the front cover furthermost from the spine member when the object holders are in the unfolded position and the covers are in their open position. Further, each of the object holders has a top and bottom planar facing surface, the top planar facing surface of the first object holder being in substantial abutment with the bottom planar facing surface of the second object holder when in the folded or unfolded positions.

In another aspect of the present invention, the height of the stack of object holders when in the folded position is not more than the width of the spine member between the covers. Additionally, the spacer is preferably attached to the back cover, and the second object holder is connected to the covers only through the spacer.

In another embodiment of the present invention, the storage book for holding a plurality of discs or other substantially-flat objects comprises front and back covers interconnected by a spine member and movable between a closed position, wherein the covers are generally stacked in parallel disposition to one another, and an open position, wherein the covers are generally co-planar, comprises a binding member attached to one of the covers and having an alternating plurality of mounting surfaces and spacer surfaces each separated by a fold line, and further comprises a plurality of disc holders each mounted to a respective one of the mounting surfaces such that the disc holders are movable between a folded position, wherein the disc holders fully overlap in stacked relation to one another when the covers are in the closed position or the open position, and an unfolded position, wherein the disc holders partially overlap in staggered relation to one another when the covers are in the open position.

In another aspect of this embodiment, a side edge of each of the disc holders may be substantially in alignment with a respective one of a first series of alternating fold lines. Further, each disc holder may be pivotally movable generally about the side edge of a next lower disc holder. Additionally, each one of a second series of alternating fold lines may be disposed intermediate opposed side edges of a respective disc holder.

In another aspect of this embodiment, the side edge of a topmost disc holder is substantially flush with an edge of the front cover furthermost from the spine member when the disc holders are in the unfolded position and the covers are in the open position. Further, each of the mounting surfaces is substantially the same width as each of the spacer surfaces.

In another aspect of this invention, each of the disc holders has a top and bottom planar facing surface, the bottom planar facing surface of each of the disc holders being in substantial abutment with the top planar facing surface of each next lower disc holder when in the folded and unfolded positions. In addition, the height of the disc holders when in the folded position is not more than the width of the spine member between the covers.

In another aspect of the present invention, the disc holders may be a pocketed, transparent folder, which may or may not include a movable flap covering the opening of the pocket. The disc holders may alternatively be a press-insert type storage container, such as the base portion of a jewel-type CD case. Further, the disc holders may be shaped and sized to hold one or a plurality of discs. In addition, the disc holders may be fixedly or releaseably connected to their respective mounting surfaces. Finally, the binding member is attached only to the back cover, and the disc holders are connected to the covers only through the binding member.

BRIEF DESCRIPTION OF THE DRAWINGS

A preferred embodiment of the present invention will now be described in detail with reference to the accompanying drawings, wherein.

DETAILED DESCRIPTION OF A PREFERRED EMBODIMENT

Figure 1:
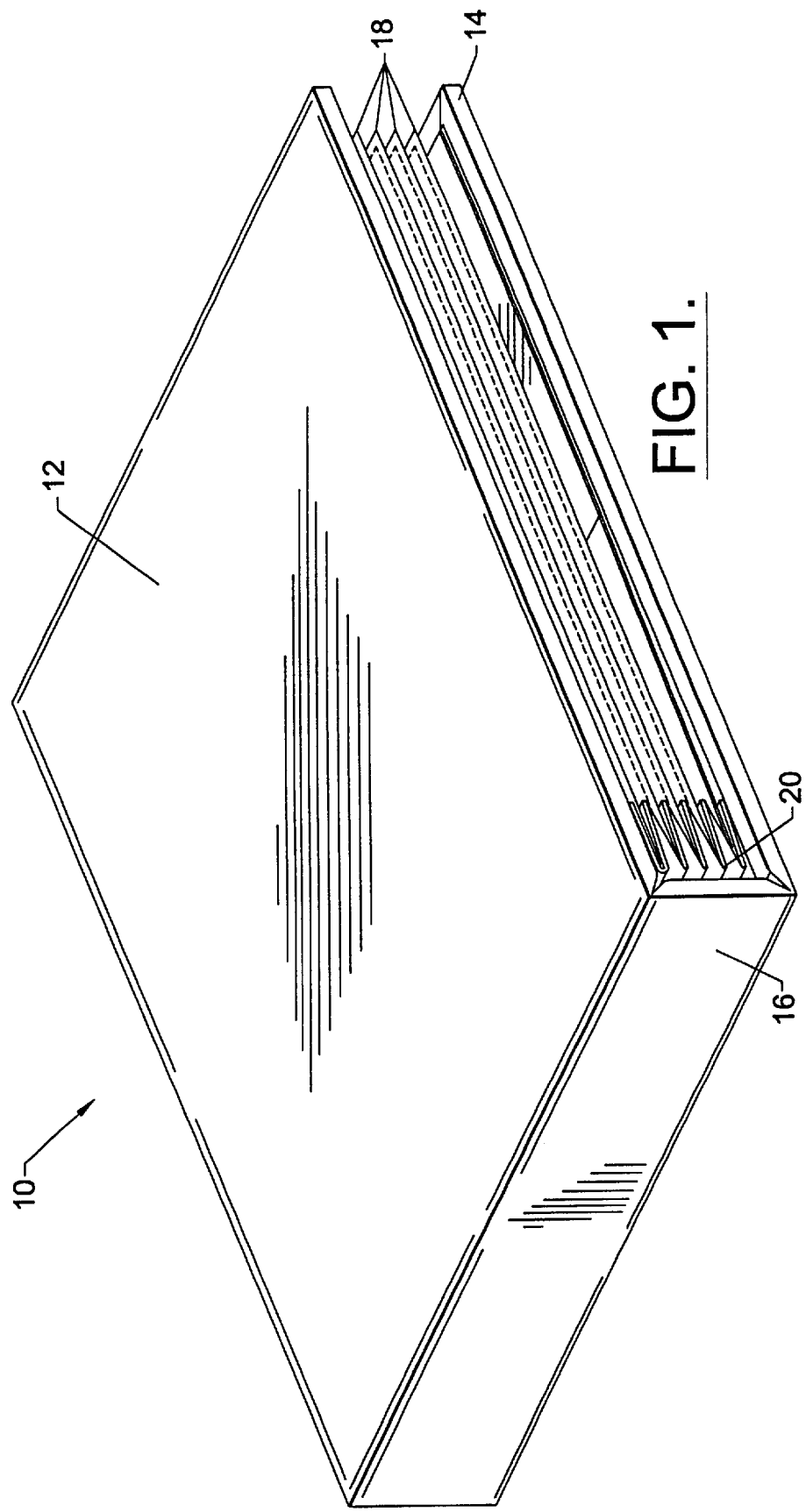
FIG. 1 is a perspective view of one embodiment of the present invention with the storage book in a closed and folded position.

Referring now to FIG. 1, a storage book 10 of the present invention is shown in closed position. The storage book 10 has a front cover 12 and a back cover 14 joined together by a spine member 16 to form a book-like cover for the storage book 10. When in the closed position, the front cover 12 and back cover 14 are generally in parallel spaced relation to one another. A plurality of object holders or disc holders 18 are shown in folded position (i.e. with the disc holders 18 in fully-overlapped, stacked parallel relation to one another) between the front and back covers 12,14. A spacer 20 connects each disc holder 18 to an adjacent holder in an accordion-like fashion, as will be described in greater detail herein.

Figure 2:
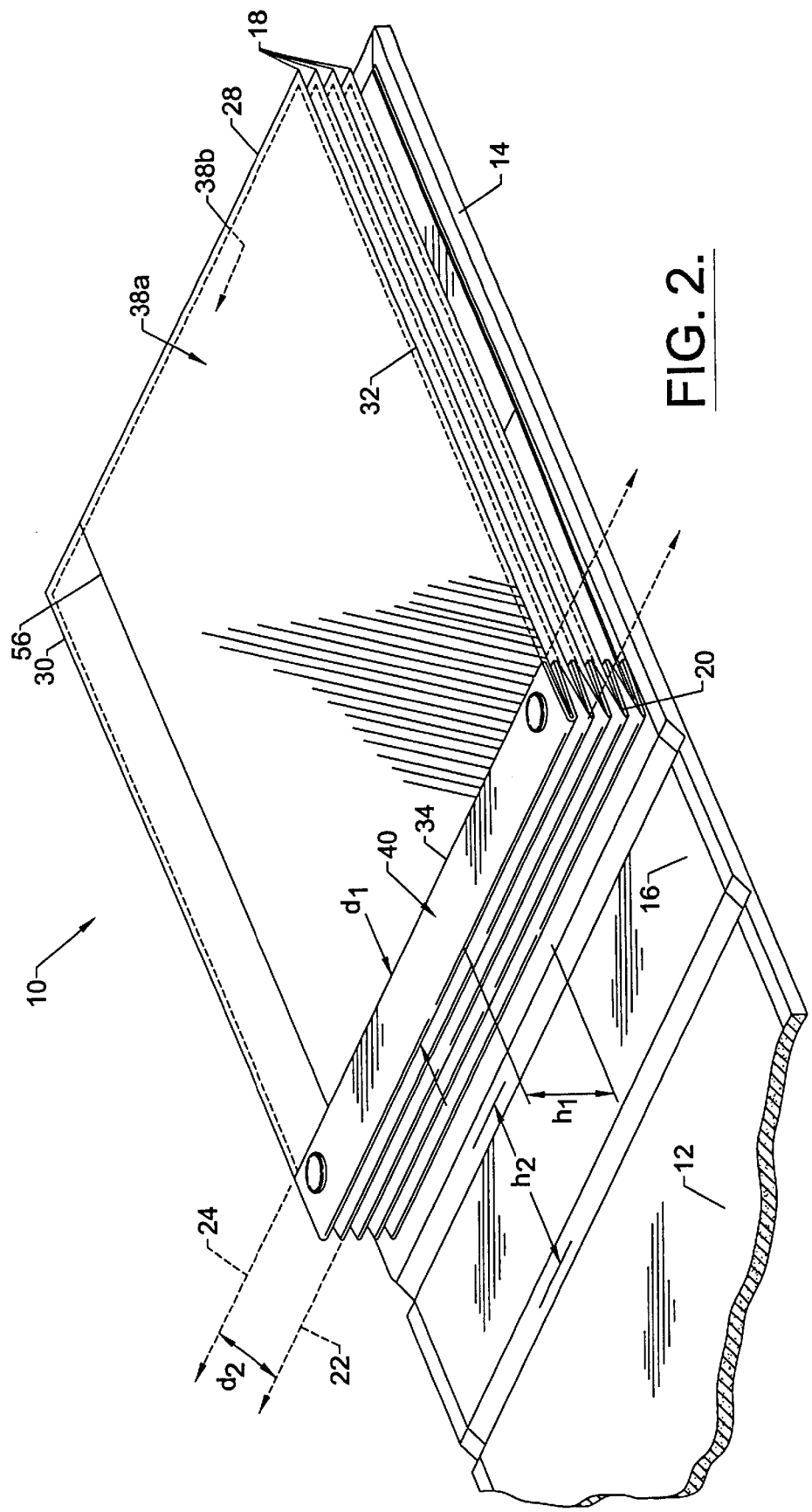
FIG. 2 is a perspective view of the storage notebook of FIG. 1 in an open and folded position.

FIG. 2 also shows the storage book 10, but this time in an open position. In the open position, the front cover 12 and back cover 14 of the storage book 10 are generally co-planar. As in FIG. 1, the disc holders 18 are shown in folded position. Each disc holder 18 has an interior side edge 26 (see FIG. 6), an exterior side edge 28, a top edge 30, a bottom edge 32, and flat top and bottom facing surfaces 38a, 38b. When in folded position, the bottom facing surface 38b of each disc holder 18 lays in substantial abutment with the top facing surface 38a of the next lower disc holder 18. Spacer 20 connects each disc holder 18 with its adjacent disc holder 18 between interior edge 26 of one disc holder 18 and interior portion 34 of the next higher disc holder 18. The connection between spacer 20 and each interior edge 26 forms a pivot axis 22. The connection between spacer 20 and each interior portion 34 forms another pivot axis 24. In a preferred embodiment, pivot axes 22, 24 correspond with fold lines in spacer 20. In a preferred embodiment, the distance d1 between interior edge 26 and interior portion 34 of one disc holder 18 is substantially the same as the distance d2 between pivot axes 22 and 24 of adjacent disc holders 18. Distances d1 and d2 must be substantially the same for the stack of disc holders 18 to lay in the folded position and without any offset of side edges 26 between adjacent disc holders 18. Also, in a preferred embodiment, the height h1 of the stack of disc holders 18 is substantially the same as the width h2 of the spine member 16 between covers 12, 14. Although height h1 may be less than width h2, it is generally not desirable for height h1 to be greater than width h2 since that will not allow covers 12, 14 to move fully into the closed position. As can be seen further in FIG. 2, the stack of disc holders 18 connects only with back cover 14 and not with front cover 12 or spine member 16. This arrangement allows the stack of disc holders 18 to remain in folded position even when the covers 12, 14 are in an open position. In an alternative embodiment (not shown), the stack of disc holders 18 could be slidably connected to front cover 12 to enable the stack to automatically transition from folded to unfolded position when the covers 12, 14 move from closed to open position. With this alternative arrangement, the stack of disc holders 18 would not remain in folded position when the covers 12, 14 move to the open position.

Figure 3:
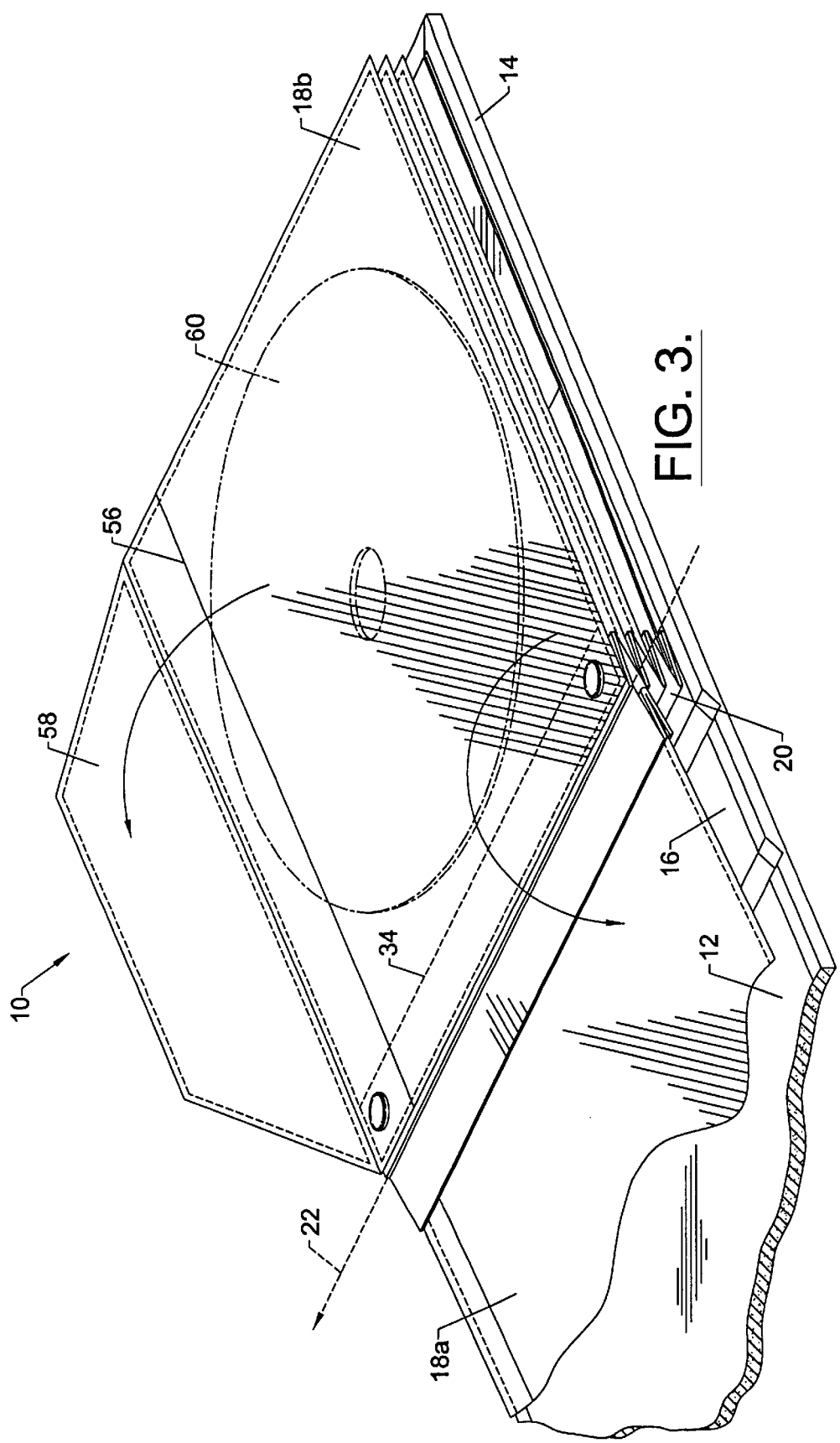
FIG. 3 is a perspective view of the storage notebook of FIG. 1 in an open and folded position with the topmost page turned.

FIG. 3 also shows the storage book 10 in an open position. The disc holders 18 are in a folded position with the topmost disc holder 18a turned in a conventional book-like manner about pivot axis 22 of the next lower disc holder 18b. Although not shown, it should be understood that each disc holder 18 (or plurality of disc holders 18) can also be turned in a similar convention book-like manner about pivot axis 22 of the next lower disc holder 18 that is not being turned to allow for "page-by-page" viewing of each separate disc holder 18.

Figure 4:
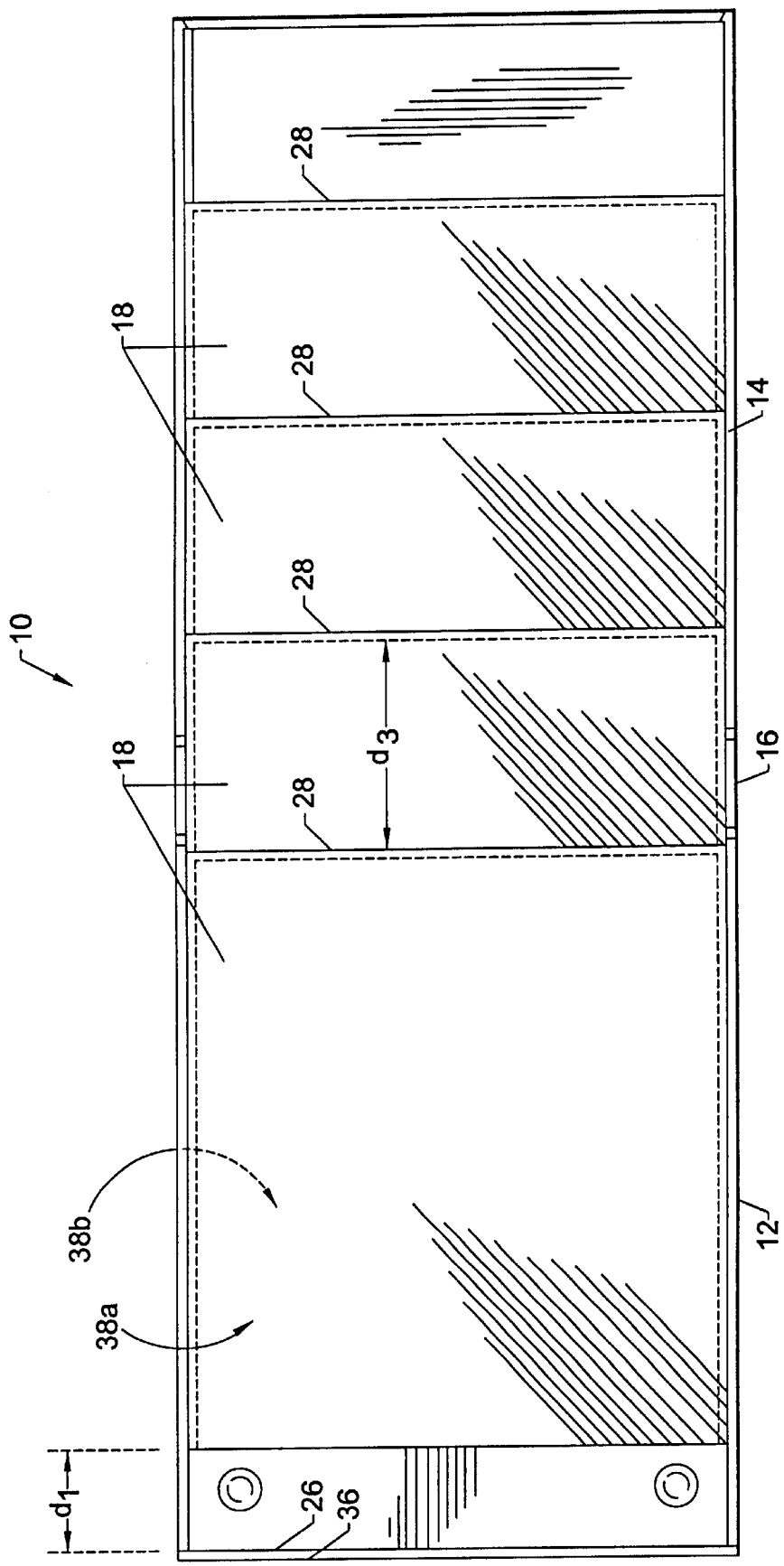
FIG. 4 is a plan view of the storage notebook of FIG. 1 in an open and unfolded position.

FIG. 4 shows the storage book 10 again in an open position, but this time the disc holders 18 are shown in a fully unfolded position. In the unfolded position, the disc holders 18 partially overlap in staggered relation to one another. It should be understood that each disc holder 18 can be moved into a staggered position relative to the next lower disc holder 18 on the stack until all of the disc holders 18 have been so moved and the entire stack is in the fully unfolded position. In a preferred embodiment, when in the fully unfolded position, the interior edge 26 of the topmost disc holder 18 is substantially in alignment with the side edge 36 of front cover 12. In addition, the distance d3 between exterior edges 28 of adjacent disc holders 18 is approximately equal to the sum of distances d1 and d2; thus, the available area for viewing the contents of each disc holder 18 can be adjusted by modifying the lengths of distances d1 and d2. Similar to when in the folded position, when in the unfolded position the bottom facing surface 38*b* of each disc holder 18 lays in substantial abutment with the top facing surface 38*a* of the next lower disc holder 18.

Figure 5:
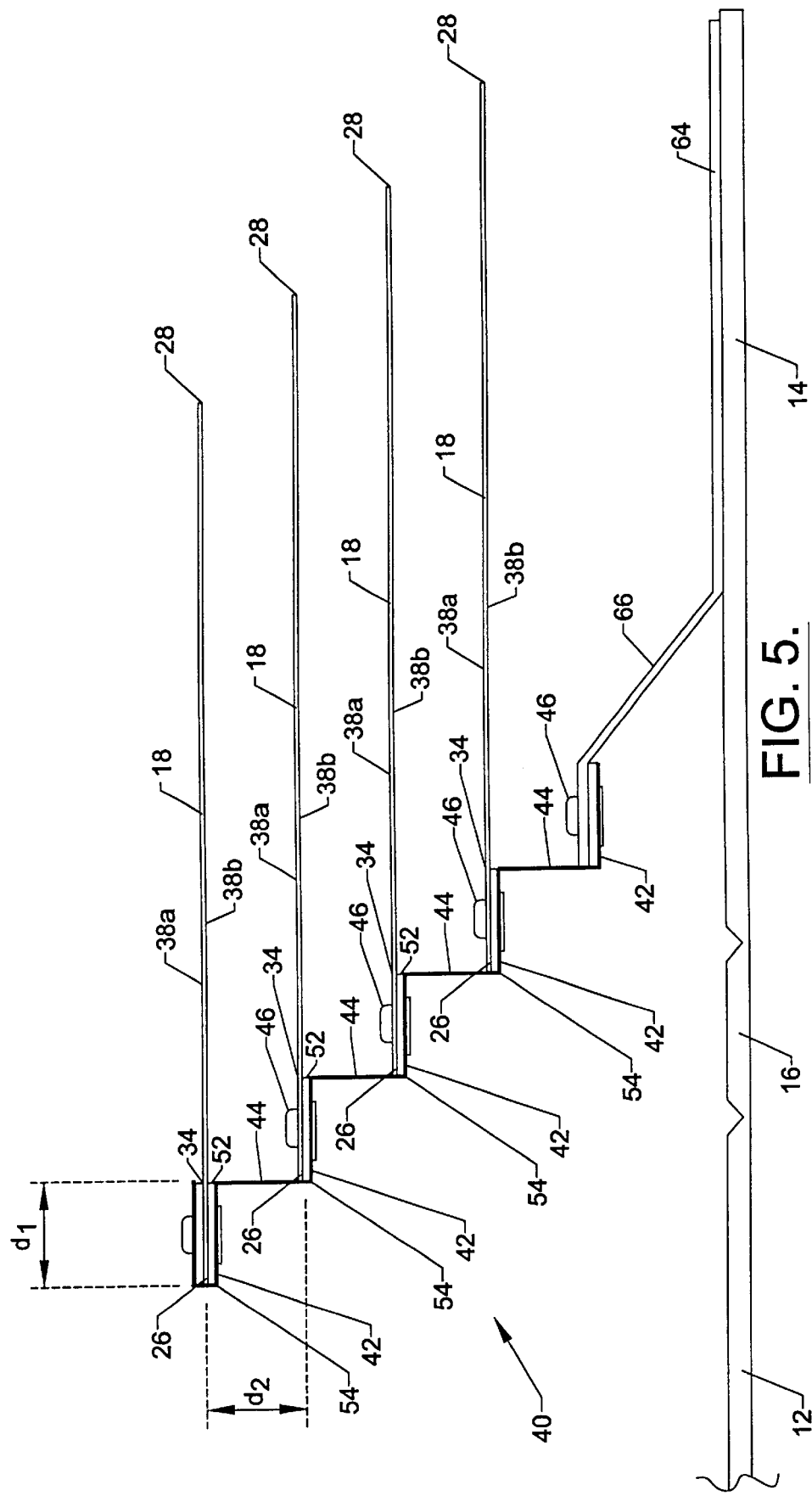
FIG. 5 is a side view of the storage notebook of FIG. 1 in an open position and in an expanded transition between folded and unfolded positions.

Referring now to FIG. 5, a side view of the disc holders 18 are shown in transition between the folded and unfolded positions with the binding member 40 expanded out away from the covers 12, 14 in order to show additional details and relationships between elements. The binding member 40 consists of a plurality of mounting surfaces 42 and spacer surfaces 44, which alternate with one another in accordion-like fashion. Because the length d1 of each mounting surface 42 is substantially the same as the length d2 of each spacer surface 44, the disc holders 18 have the capability of moving between the folded and unfolded positions as previously discussed. As was seen in FIG. 2, each spacer surface 44 connects each disc holder 18 with its adjacent disc holder 18 between interior edge 26 of one disc holder 18 and interior portion 34 of the next higher disc holder 18. The connection between spacer surface 44 and each interior edge 26 forms a pivot axis or fold line 54. The connection between spacer surface 44 and each interior portion 34 forms another pivot axis or fold line 52. Each fold line 54 is included within a first series of alternating fold lines. Correspondingly, each fold line 52 is included within a second series of alternating fold lines. As was shown in FIG. 2, the stack of disc holders 18 connects only with back cover 14 and not with front cover 12 or spine member 16 through binding member 40. More specifically, mounting member 64 of binding member 40 is fixedly connected in abutting relationship with the interior of back cover 14 and extension member 66 extends away from mounting member 64 and connects with the first mounting surface 42 by means of pin 46 or other conventional connection means. In this embodiment, each disc holder 18 is connected to a respective mounting surface 42 using pins 46.

Figure 6:
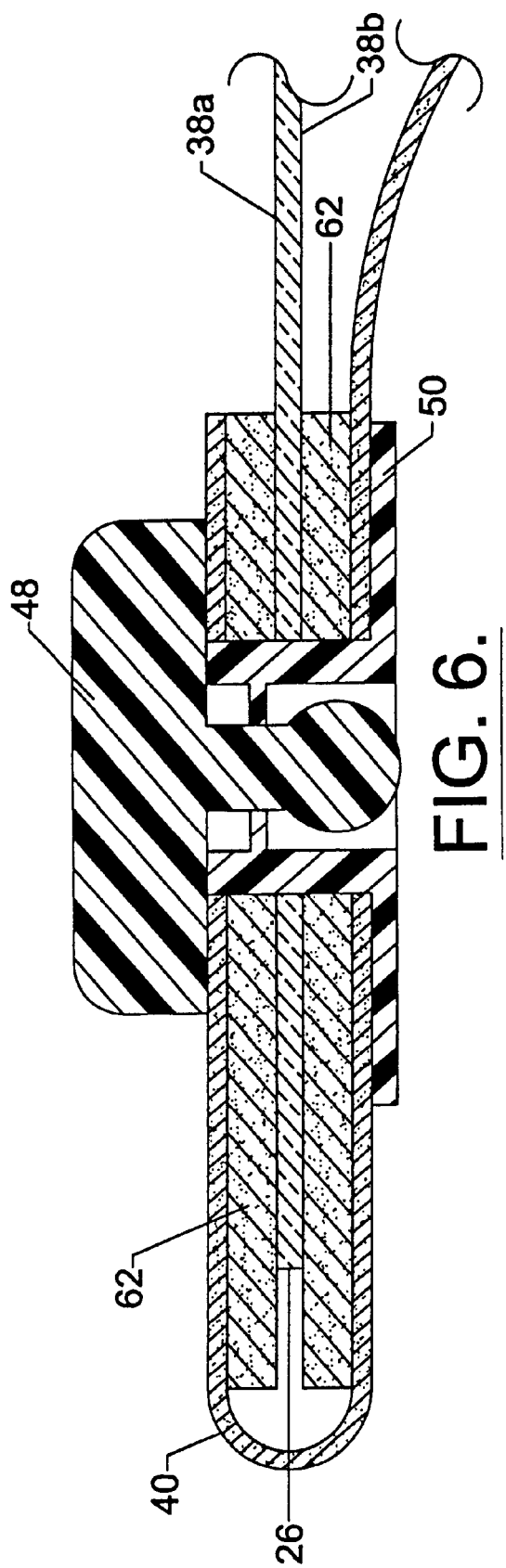
FIG. 6 is an enlarged cross-sectional view of a portion of the storage notebook shown in FIG. 5.

As can be seen in FIG. 6, pin 46 consists of a male member 48 that removably inserts into female member 50. Additionally, reinforcement members 62 may be used to strengthen the connection of pin 46 with disc holder 18 and binding member 40. Preferably, two reinforcement members 62 are used in conjunction with the topmost disc holder 18 but only one reinforcement member 62 need be used with the disc holders 18 below the topmost. It should also be understood that any type of conventional connection means other than pin 46 could be used to connect disc holder 18 with mounting surface 42. For example, a permanent compression-type pin or ring could be used. In addition, each disc holder 18 could be connected to its respective mounting surface 42 using any suitable adhesive. Further, it should be understood that one or more combinations of connection means could be used on any single disc holder 18 or on different disc holders 18 within the same stack. The advantage of using pins 46, especially for the topmost disc holder 18, is the capability of adding additional binding members (not shown) to the existing binding member 40 to expand the number of disc holders 18 that can be contained within storage book 10.

Figure 7:
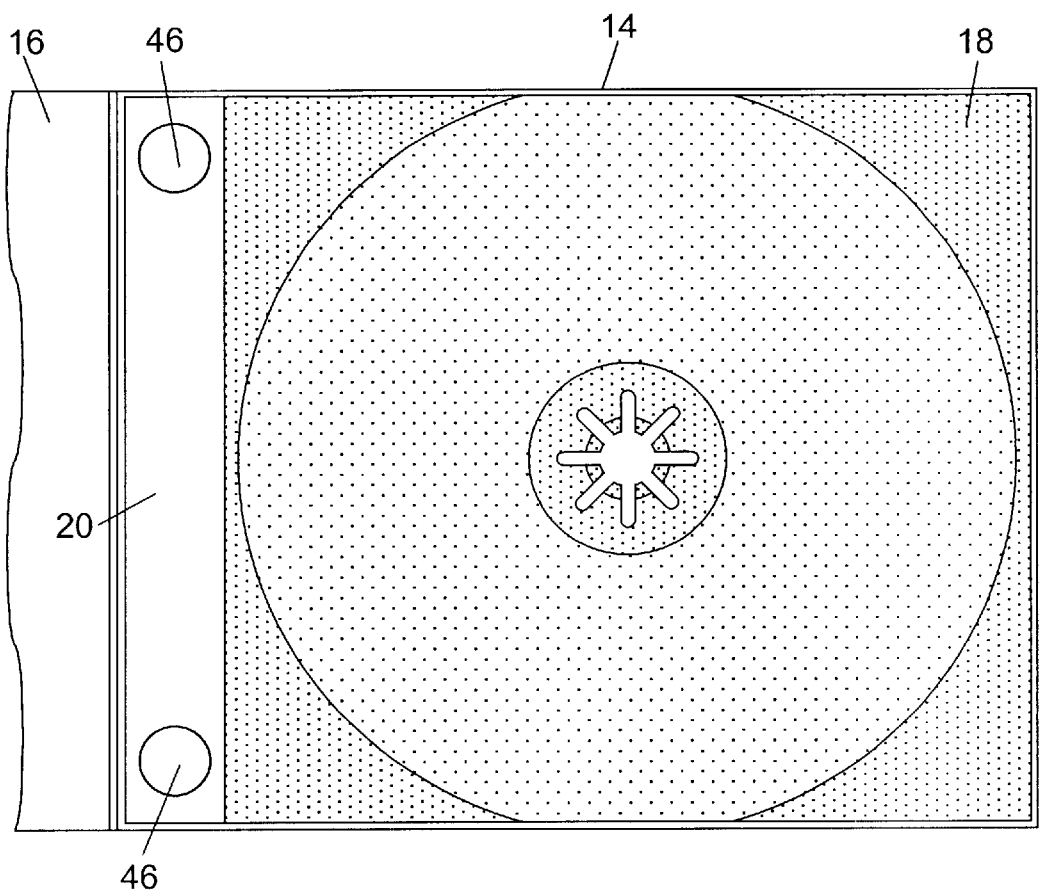
FIG. 7 is a partial top view of an alternative embodiment of the storage book.

It should be further understood that disc holders 18 could be shaped or formed to hold many different types of substantially flat objects in many different types of manners. For example, as shown in FIG. 2, each disc holder 18 could be a transparent plastic folder with a top-loaded slot 56 for receiving a disc or other object 60 in the pocket created between top and bottom facing surfaces 38*a*, 38*b*. Optionally, as shown in FIG. 3, such a top-loaded pocket disc holder 18 could have a flap 58 covering the slot 56 of each pocket. In another alternative (not shown), each disc holder 18 could be constructed of cardboard and have an appropriate pocket for receiving a disc. Further, as shown in FIG. 7, another type of disc holder 18 could be a press-insert storage container, similar to the bottom portion of a standard jewel box CD container. Finally, it should be understood that each disc holder 18 could be sized to include any number of discs, objects, or combination of discs and objects per "page." Preferably, however, in order to keep the storage book 10 of reasonable size, each disc holder 18 will be sized to hold one, two, or four such discs or objects per page.

In practice, the storage book 10 of the present invention enables one to hold a plurality of discs or substantially-flat objects, such a CDs, DVDs, photographs, computer diskettes, or the like, in a protected notebook container as seen in FIG. 1. The storage book 10 can then be opened as shown in FIG. 2. Unlike a conventional book, however, the disc holders 18 remain stacked when the storage book 10 is in the fully opened position because the disc holders 18 are connected only to the back cover 14 through spacer 20 or binding member 40. From this position, each topmost disc holder 18 can be turned one at a time for conventional page-by-page viewing as shown in FIG. 3. When turned in this manner, such disc holder 18 pivots about axis 22 or fold line 54 of the next lower disc holder 18 in the stack. Alternatively, one or more of the disc holders 18 can be pivoted about its own axis 24 or fold line 52 and along the inner surface of front cover 12 until the stack of disc holders 18 is in the fully unfolded position as shown in FIG. 4. When in the unfolded position, multiple objects (or at least a portion of each object stored in the disc holders 18) may be viewed simultaneously.

As can be seen from the detailed specification, some of the benefits of the present invention include the ability to store a plurality of objects or discs in a notebook-type storage container, which provides adequate protection for such objects. Additional benefits of the present invention include the ability to open the notebook to view each "page" in a conventional manner by turning one page at a time or by fanning out all of the pages in a substantially flat manner for viewing multiple objects and pages simultaneously.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a fall and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A storage book for holding a plurality of substantially planar objects, comprising:

front and back covers interconnected by a spine member and movable between a closed position, wherein said covers are generally stacked in parallel disposition to one another, and an open position, wherein said covers are generally co-planar;

a spacer attached to one of said covers; and first and second adjacent object holders each pivotally mounted at a fixed location on said spacer along folds such that said object holders are movable between a folded position, wherein said object holders fully overlap in stacked relation to one another when said covers are in said closed position and said open position, and an unfolded position, wherein said object holders partially overlap in staggered relation to one another when said covers are in said open position.

2. The storage book of claim 1, wherein said first object holder is pivotally mounted to said spacer along a side edge of said first object holder, and said second object holder is pivotally mounted to said spacer intermediate opposed side edges of said second object holder.

3. The storage book of claim 2, wherein each of said object holders is pivotally mounted to said spacer along fold lines defined in said spacer.

4. The storage book of claim 2, wherein said second object holder is pivotally movable generally about said pivotal mounting of said first object holder to said spacer.

5. The storage book of claim 2, wherein one of said side edges of said second object holder is substantially flush with an edge of said front cover furthermost from said spine member when said object holders are in said unfolded position and said covers are in said open position.

6. The storage book of claim 1, wherein each of said object holders has a top and bottom planar facing surface, said bottom planar facing surface of said first object holder being in substantial abutment with said top planar facing surface of said second object holder when in said folded position.

7. The storage book of claim 1, wherein each of said object holders has a top and bottom planar facing surface, said bottom planar facing surface of said first object holder being in substantial abutment with said top planar facing surface of said second object holder when in said unfolded position.

8. The storage book of claim 1, wherein a height of said object holders when in said folded position is not more than the width of said spine member between said covers.

9. The storage book of claim 1, wherein said spacer is attached to said back cover, and said second object holder is connected to said back cover only through said spacer.

10. A storage book for holding a plurality of discs, comprising:

front and back covers interconnected by a spine member and movable between a closed position, wherein said covers are generally stacked in parallel disposition to one another, and an open position, wherein said covers are generally co-planar;

a binding member attached to one of said covers and having an alternating plurality of mounting surfaces and spacer surfaces each separated by a fold line;

a plurality of disc holders each mounted to a respective one of said mounting surfaces such that said disc holders are movable between a folded position, wherein said disc holders fully overlap in stacked relation to one another when said covers are in said closed position and said open position, and an unfolded position, wherein said disc holders partially overlap in staggered relation to one another when said covers are in said open position.

11. The storage book of claim 10, wherein a side edge of each of said disc holders is substantially in alignment with a respective one of a first series of alternating fold lines.

12. The storage book of claim 11, wherein each disc holder is pivotally movable generally about said side edge of a next lower disc holder.

13. The storage book of claim 11, wherein each one of a second series of alternating fold lines is disposed intermediate opposed side edges of a respective disc holder.

14. The storage book of claim 11, wherein said side edge of a topmost disc holder is substantially flush with an edge of said front cover furthermost from said spine member when said disc holders are in said unfolded position and said covers are in said open position.

15. The storage book of claim 10, wherein each of said mounting surfaces is substantially the same width as each of said spacer surfaces.

16. The storage book of claim 10, wherein each of said disc holders has a top and bottom planar facing surface, said bottom planar facing surface of each of said disc holders being in substantial abutment with said top planar facing surface of each next lower disc holder when in said folded position.

17. The storage book of claim 10, wherein each of said disc holders has a top and bottom planar facing surface, said bottom planar facing surface of each of said disc holders being in substantial abutment with said top planar facing surface of each next lower disc holder when in said unfolded position.

18. The storage book of claim 10, wherein a height of said disc holders when in aid folded position is not more than the width of said spine member between said covers.

19. The storage book of claim 10, wherein one of said disc holders is a pocketed, transparent folder.

20. The storage notebook of claim 19, wherein said folder includes a movable flap covering the opening of said pocket.

21. The storage notebook of claim 10, wherein one of said disc holders is a press-insert storage container.

22. The storage notebook of claim 10, wherein one of said disc holders is capable of holding a plurality of discs.

23. The storage book of claim 10, wherein one of said disc holders is releasably connected to its respective mounting surface.

24. The storage book of claim 10, wherein one of said disc holders is fixedly connected to its respective mounting surface.

25. The storage book of claim 10, wherein said binding member is attached only to said back cover, and said disc holders are connected to said back cover only through said binding member.

* * * * *